Figure 1:
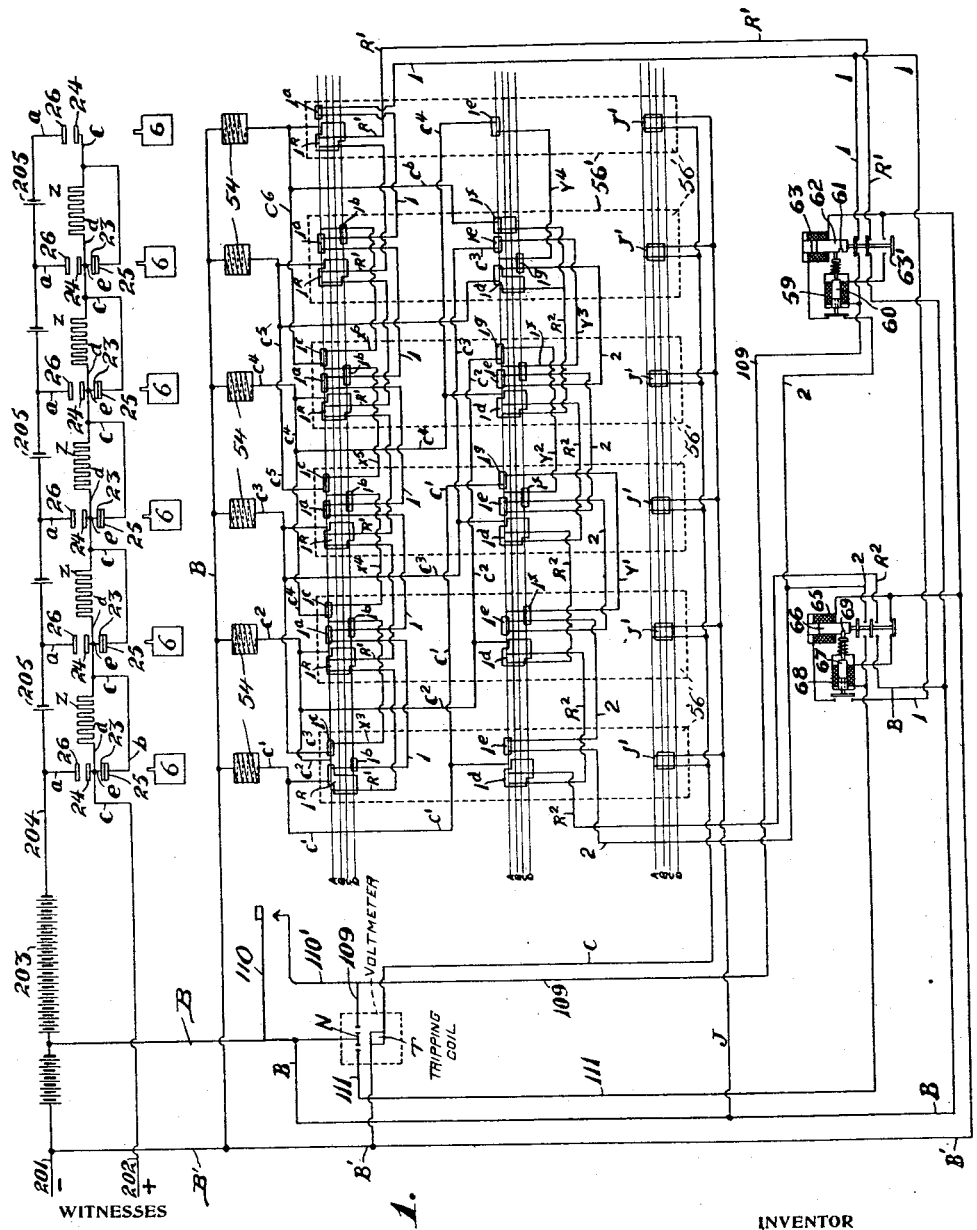

E. H. BENDEL.
AUTOMATIC POTENTIAL REGULATOR.
APPLICATION FILED DEC. 5, 1912.
1,182,241.
Patented May 9, 1916.
2 SHEETS—SHEET 2.
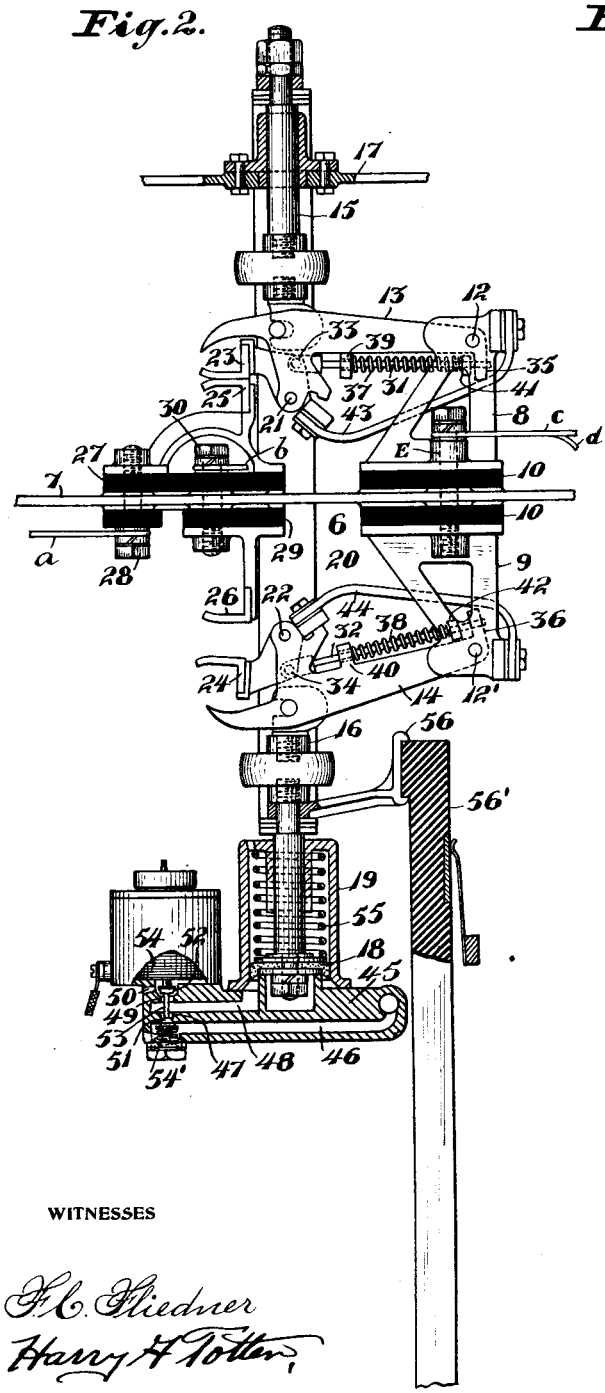
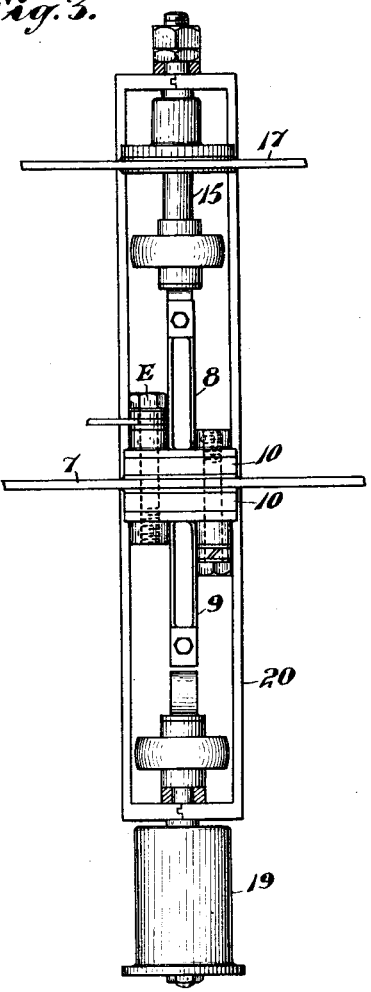
WITNESSES
INVENTOR
Emil H. Bendel
BY
ATTORNEY

UNITED STATES PATENT OFFICE.

EMIL HENRY BENDEL, OF OAKLAND, CALIFORNIA.

AUTOMATIC POTENTIAL-REGULATOR.

1,182,241.   Specification of Letters Patent.   Patented May 9, 1916.

Application filed December 5, 1912. Serial No. 735,054.

*To all whom it may concern:*

Be it known that I, EMIL HENRY BENDEL, a citizen of the United States, residing at Oakland, in the county of Alameda and State of California, have invented certain new and useful Improvements in Automatic Potential-Regulators, of which the following is a specification.

The hereinafter described invention relates to an improved automatically operated potential regulator system for maintaining constant the voltage from a battery across the mains of an electric circuit into which the battery feeds; and has for its principal object to automatically and instantaneously switch end-cells, generators, series coils of a transformer or other suitable sources of electric energy in or out of series with the regular battery as the voltage across the mains rises or falls.

Another object is to provide a system of the above type which is controllable by the indicator hand of a voltmeter which operates in such manner that when the voltage across the mains falls below normal, the hand will operate to throw sufficient end cells in series with the regular battery to maintain the voltage normal, or if end cells are in series with the regular battery and the voltage rises, the hand will operate to throw certain of the end cells out of series with the main battery and maintain the voltage across the mains normal.

The invention consists of a system of wiring connected to the mains, a plurality of cells or cells in parallel normally out of circuit with the mains, a voltmeter for indicating the voltage across the mains and an automatic switch associated with each of said sets of end cells and operatable by the said indicating hand of the voltmeter for throwing certain of said sets of end cells into or out of series with said main battery to maintain the voltage across said mains constant.

With the above mentioned and other objects in view, the invention consists in the arrangement and combination of elements, hereinafter fully described, illustrated in the accompanying drawings and pointed out in the claims hereto appended; it being understood that various changes in the form, arrangement and minor details of construction, within the scope of the claims, may be resorted to without departing from the spirit or sacrificing any advantages of the invention.

To fully comprehend the invention reference should be had to the accompanying sheets of drawings disclosing one form of my invention, wherein—

Figure 1 is a diagrammatic view of my improved regulator system showing the different elements of the system with the contacts and connections from one element to the other, and showing the interlocking panels in dotted lines and in their lowermost position. Fig. 2 is a side elevation, partly in section, of my improved double throw switch for operating my improved regulating system, disclosing the switch operating mechanism and a portion of the interlocking panel carrying suitable contact plates for controlling certain circuits upon the operation of the switch. Fig. 3 is a rear elevation of my improved switch disclosing the frame connecting the upper and lower switch arms.

Referring more particularly to the drawings, the numerals 201 and 202 refer respectively to the minus and plus mains of an electric circuit, normally supplied with electric current from a battery 203, and said battery is connected through a lead 204 with end cells 205 which are normally out of circuit with said mains 202 when the voltage across said mains is normal, and are thrown into or out of circuit with said mains by automatic switches 6, one of said switches controlling each set of end cells and cutting the same either in or out of circuit with said mains as the voltage across said mains rises or falls, said switches being adapted to be operated sequentially.

The switch comprises a supporting plate 7 which is attached to any suitable base, not shown, and to the plate are attached, one on each face thereof, suitable brackets 8 and 9, the same being insulated from the plate by suitable material 10, and secured in position on said plate by a bolt E insulated from the supporting plate and which provides a contact between the brackets and forms a binding post from which extend the leads $c$ and $d$; the lead $c$ of the first switch connecting with the main 202 and the lead $d$ connecting to the resistance Z between the end cells.

Pivotally mounted at one end, as at 12 and 12', to the brackets 8 and 9 are arms 13 and 14 which are pivotally connected to, but insulated from the ends of suitable rods 15 and 16, the rod 15 reciprocating through an opening in a guide plate 17, and the rod 16 carrying at its lower end a plunger 18 which operates in a barrel 19, the two rods being connected to operate together by an oblong frame 20.

Pivotally mounted, as at 21 and 22, to the free ends of the arms 13 and 14 are contact fingers 23 and 24 which are adapted upon the operation of the plunger 18 to be alternately thrown into or out of engagement with their respective stationary contacts 25 and 26, carried one on either face of the supporting plate 7, the finger 23 coöperating with the contact 25 which is insulated from the plate by suitable material 27, and is secured to the plate by a suitable bolt 28 which is insulated from the plate and which provides a binding post from which post extends the lead b, said lead b intersecting the resistance Z and lead c of the next switch to the right. The finger 24 coöperates with the contact 26 which is insulated from the plate 7 by suitable material 29, and is secured to the opposite face of the plate from the contact 25 by a bolt 30 also insulated from the plate and which provides a binding post from which extends a lead a projecting to the end cells controlled by the switch associated therewith.

Extending from each of the contact fingers 23 and 24 are suitable rods 31 and 32, the forward ends of which are pivoted to their respective fingers as at 33 and 35, and the rear ends of said rods sliding through suitable apertures in the lugs 35 and 36 which project upwardly from the rear of the arms 13 and 14. Coiled compression springs 37 and 38 surround each of the rods 31 and 32, the forward ends of said springs abutting against projections 39 and 40 formed adjacent the free ends of the arms, and the rear ends of said springs are secured to suitable adjustable nuts 41 and 42 carried adjacent the inner ends of the rods, and from the above construction it will be observed that the pivoted fingers will, when not in tight engagement with the stationary fingers, be held at an angle to the face thereof and upon the operation of the arms, in a hereinafter described manner, the pivoted fingers when making a contact with their coöperating fingers will at first lightly engage at their outer ends and then with a wiping action will firmly engage at their inner ends, and when breaking contact will first disengage at their inner ends and before final disengagement will be only slightly touching at their forward ends, this action preventing the formation of an arc either in the making or breaking of contacts.

Suitable shunts 43 and 44 extend from lugs at the rear of the fingers 23 and 24, and said shunts are connected to their respective arm brackets adjacent the pivoted points of the arms, the current when said contacts are in engagement being directed through said shunts to prevent the burning out of the several pivotal points of the arms.

Each switch is operated by the following mechanism: The lower open end of the barrel 19 is secured to a base 45 in which is formed a channel 46, connected at one end to any suitable supply of compressed air and at its opposite end communicating through a passage 47 with a channel 48 which leads to the open end of the barrel 19. A passage 49 leads from the channel 48 directly above the passage 47, and communicates through a branch passage 50 with the outside atmosphere, and said passages 47 and 49 are controlled respectively by valves 51 and 52 carried by a common valve stem 53, each valve opening in an opposite direction and both are operated by a common magnet coil 54; the coil 54 when energized operating the valve 51 to open the passage 47 between the channels 46 and 48 and operating the valve 52 to close the passage between the channel 48 and the atmosphere, and admitting compressed air to enter the barrel 19 and force the plunger 18 upwardly, breaking the contact between 23 and 25, and making the contact between 24 and 26. When the magnet coil 54 is deenergized, the valve 51 is closed by the action of a spring 54' and the valve 52 is operated to open the passage 49 between the channel 48 and the outside atmosphere, and the air within the barrel 19 is forced therefrom by the action of a coiled spring 55 which forces the plunger downwardly in the barrel when the air pressure therein is released. A suitable bracket 56 is attached to the insulated portion of the rod 16 and carries at its outer end a suitable panel 56' of non-conducting material and on the outer face of which are positioned suitable contact plates, hereinafter more fully described.

A complete description of the wiring, contacts and operation of several switches is hereinafter given, and the same it is thought will suffice for all of the switches disclosed in the drawings as the additional switches and operation thereof are identical with those described.

Suitable leads B and B' extend from the mains, as in Fig. 1 of the drawings, and the lead B is connected to the indicating hand N of any suitable voltmeter, whereby contact may be made between the lead B and with the lines 109 and 111. As the voltmeter is of conventional design the coil for operating the needle has been omitted. Leads 109 and 111 are positioned in operative relation with the hand N of the voltmeter and when it is desired to feed from the battery 203 into the mains, a momentary contact is made between B and 109 through the key 110 and 110′, and the voltmeter which is connected in the usual manner to the mains is put in operation, and after the main battery is cut in, should the voltage across the mains drop below normal, the indicating hand N of the voltmeter will contact with the lead 109, and if the voltage rises above normal, the hand N makes contact with 111. Upon the actuation of the key 110, a momentary circuit is formed through B and 109. The current flowing through 109 will energize the armature 59 and withdraw the end of the plunger 60 therein, from the cut out 61 in the solenoid 62 of the armature 63 should the same be engaged therewith, thus permitting the plates 63′, which are carried by the armature to drop and contact will then be made between 109 and lead 1, the current flowing through the leads 1, contact plates 1ª, the wires $c'$ to the main B′. Under these conditions the magnet valve 54 that is associated with the first of the automatic switches 6, or that magnet valve to the right of the one that controls the switch 6 that is closed, will be energized. The magnet will operate the valve 51 permitting air to flow from the compressed air storage means into the lower end of the barrel 19, the plunger 18 being forced upwardly and in its movement operating the arms 13 and 14, the panel 56′ carried by the member 56 being in the position marked A before the plunger starts its movement. The current from the wire 1 also flows through the solenoid 65 in which is mounted a core 66 carrying contact plates, which make contact between 111 and 2, and B and R², lifting the plates from their respective contacts, should the same be down, the core 66 being held in its elevated position by the outwardly spring-pressed core 67 of the reset solenoid 68 engaging a suitable notch 69 in the core 66.

Shortly after the plunger 18 has started its movement upwardly, a circuit is completed between a wire J on panel 56′ and the wire B through the contact plate J′ on panel 56′, the wire J extending from the lead B′ and through a solenoid T, the solenoid when energized tripping the needle N from contact with the wire 109 to insure that the contact between the needle N and wire 109 must be made each time after a cell has been switched in series with the main battery, and that a single contact between N and 109 cannot cut more than one cell in series with the battery. At approximately the same instant that the above operation takes place, the contact plate 1ª on the first panel in its movement will have broken the contact of lead 1, but simultaneously therewith a connection is made between a lead $c'$ and a holding circuit R′ which energizes the magnet coil, fully closing the switch associated with the same. The switch when operating will first break contacts 23 and 25, which, when in contact, short circuit the resistance Z, and the fingers 24 and 26 will connect the battery leads to the mains 204 and 202, and when this operation is fully completed the portions of the insulating panel, indicated by the line D in Fig. 1 of the drawings, will be in the position designated by the line A, or in its highest elevated position. Should the voltage across the mains 201 and 202 now fall below normal, the hand N will again contact with the lead 109 and current will flow through lead 109 to lead 1, as the solenoid 62 is still in its dropped position, and from lead 1 it will flow through the contact plates 1ª on the several panels and through the contact plate 1ᵇ of the first switch panel which is now in its uppermost position, as the main battery is now in on the line. From the contact plate 1ᵇ the current will flow through the lead $c^2$ to the return B, and energize the magnet coil controlling the switch 6 of the second set of end cells, the switch operating in the same manner as the one hereinbefore described. As the panel is moved upward by the switch, the plate J′ on the second panel will contact with the wires J and B and restore the needle N to its mid position, the plate 1ª of the second panel will break contact with the lead 1 and simultaneously therewith the plate 1ᴿ in its upward movement will make contact between $C^2$ and the holding circuit R′ which energizes the magnet coil and fully closes the switch associated with the same. The panel as it has about reached its highest point of movement, or when the portion on line D has moved to the position A, the contact between the plate 1ᴿ of the second panel and the holding circuit R′ leading to the first switch will be broken permitting the first switch to drop or open. The first switch will now be fully open and the second switch fully closed. This operation switches a cell in series with the battery and the voltage across the mains is increased thereby by the voltage of one cell. During the instant of time that both the first and second switches are closed, the cell to be connected in series is prevented from being short-circuited by the resistance grid Z between the switches, and this resistance is short circuited by the making of the contacts 23 and 25 of the first switch. Should the voltage across the lines again fall below normal, the third switch would be cut in on the line through the lead 1, plate 1ᵇ of the second panel, which is in its uppermost position and which connects lead 1 and $x^3$, lead $x^3$ connecting with plate 1ᶜ of the first panel which is in its lowermost position and which connects $x^3$ and $c^3$, the circuit thus formed energizing the magnet controlling the third switch; the plate $1^R$ which upon completing its upward movement breaking the contact with R' and the second panel, and permitting the second switch to drop or open. The third switch cannot fully close until the first switch is fully open, this regulation being controlled by the $x^3$ circuit, as the current when the second switch is closed flows from the lead 1 through the contact plate $1^b$ or the second panel, and if the first panel was not in its lowest position, contact would be broken through the contact plate $1^e$, $c^3$ and $x^3$, and if this were the case, the magnet valve of the third switch would not be energized and could not be energized until the panel of the first switch reached its lowest position when the switch controlling the same is in its open position. Again, if the voltage is not sufficient, the fourth switch will be cut on the line through the lead plate $1^b$ of the third panel which completes a circuit from 1, lead $x$ $x^4$, plate $1^e$ of the second panel and lead $c^4$, which connects with the magnet of the fourth panel and as the panel of the fourth switch is reaching its highest position, the third panel is permitted to drop and its switch to open, through the breaking of the circuit from plate $1^R$ of the fourth panel, through R' to $1^R$ of the third switch. The cutting in of the fifth switch is accomplished through the lead plate $1^b$ of the fourth panel, which completes a circuit through lead 1 and $x^5$, through plate $1^e$ of the third panel to lead $c^5$, and to the magnet coil of the fifth panel. Should the voltage continue to be insufficient, the sixth switch is cut in through lead plate $1^a$, of the sixth panel lead 1 to plate $1^b$ of the fifth panel, through $x^6$ to plate $1^e$ of the fourth panel, where it connects with lead $c^6$ extending to the magnet coil of the sixth switch. Supposing that the voltage across the mains rises above normal and that the sixth switch is closed, the needle N will contact with the lead 111, the current from the lead 111 will energize the solenoid 68 and withdraw the end 69 of the core 67 thereof from the core 66 of the solenoid 65, permitting the plates carried by the core 66 to drop and make contact between 111 and 2, and B and $R^2$, and the current through 2 will energize the solenoid 63, drawing the core 62 therein upwardly and breaking contact between 109 and 1, and B and R', this action leaves the line R' dead, and the magnet coil controlling the sixth panel is deenergized, and the panel would drop if it were not for a holding circuit $R^2$, which flows through the plate $1^d$ on the respective panels and through $c^6$ to the magnet coil of the sixth switch.

Upon the operation of the needle to form a circuit from 111 to 2, the current flows through 2 and contact plates $1^e$ on the first four panels which are in their lowest position, through plate $1^d$ of the fifth panel to lead $c^5$, energizing the magnet of the fifth panel, starting the switch to cut in, and as the switch of the fifth panel is about cut in the holding circuit from $R^2$, through plate $1^f$ of the fifth panel, to lead $c^6$ is broken, deënergizing the magnet coil of the sixth switch and disconnecting the fingers 24 and 26 thereof, and connecting the fingers 24 and 26 of the fifth switch, thus cutting out the end cell associated with the sixth switch and cutting in the cell associated with the fifth switch. As any of the panels begin to move in either direction, the plates J' carried thereby complete a circuit between J and C through the solenoid T and restore the needle N to its operative position. Should the voltage continue too strong, a circuit will be made through 2, contact plates $1^e$, of the first four, plate $1^g$ of the fifth panel, lead $y^4$ to plate $1^e$ on the sixth panel, and through $c^4$ to the magnet coil of the fourth panel.

It will be observed that unless the plate $1^e$ carried by the sixth panel is in its lowest position, that a contact cannot be made between $Y^4$ and $c^4$. The holding circuit $R^2$ maintains the fifth switch closed until the fourth is entirely closed. In cutting out the fourth switch and cutting in the third, the circuit is completed through plates $1^e$ of the first three panels to the fourth panel, through plate $1^f$ thereof, to lead $y^3$, to plate $1^e$ of the fifth panel which, when in its lowermost position, contacts with the lead $c^3$, thus energizing the magnet controlling the third panel. Should the voltage continue to be too strong and the needle again contacts with 111, a circuit will be formed through 2, plates $1^e$ of the first two panels, to plate $1^f$ of the third panel which is now in its uppermost position, through $Y^2$ to plate $1^g$ of the fourth panel, and back to the magnet coil controlling the second switch through the lead $c^2$. In cutting the second switch out and the main battery on the line, a circuit flows through 2, plate $1^e$ of the first panel, plate $1^f$ of the second panel which when in its highest position connects 2 with Y', through plate $1^g$ on the third panel, through $c'$ to the magnet coil of the switch controlling the first panel.

From the above description it will be observed that the end cells will be successively thrown in series with the main battery to maintain the voltage across the mains constant should it continue to fall below normal, and that when the end cells are in series with the mains that the same will be successively cut out of series with the mains to maintain the voltage across the same constant should the voltage across the mains rise above normal.

It is to be understood that applicant does not confine his invention to the arrangement of the elements as disclosed in the drawings, and that the regulator is capable of being operated when the battery is in parallel with dynamos, or when the battery alone supplies current to the mains, and when the battery is connected in parallel with dynamos on the mains, then the battery will charge when the voltage rises above normal and will discharge at normal. The compressed air mechanism for operating the switches may be dispensed with and supplemented by a suitable armature and the insulated portion of the rod 16 providing the core of the armature and rising when the armature is energized, each armature being connected to the lead $C^1$—$C^6$ of the respective switch.

Having thus described the invention what I claim as new and desire to secure by Letters Patent is:—

1. In an apparatus for the described purpose and in combination with a main source of electric energy, of an auxiliary source of electric energy normally out of series with the mains into which said main source of electric energy feeds, a controlling means connected across said mains and controllable by the variation of voltage thereacross, a switch associated with said auxiliary source of electric energy, a circuit between said controlling means and said switch and controllable by said controlling means for operating said switch to throw said auxiliary source of electric energy in series with said main source of energy upon the dropping below normal of the voltage across the mains into which said main source of energy feeds, and a circuit controllable by said switch to operate means for breaking contact between said controlling means and said switch.

2. In an apparatus for the described purpose and in combination with a source of electric energy and supply mains connected thereto, of end cells connected to said source of electric energy and normally out of series with the mains into which said source of electric energy feeds, a voltmeter connected across said mains and controllable by the variation of voltage there-across, a switch associated with each of said end cells, a circuit between said voltmeter and each of said switches and controllable by said voltmeter for successively operating said switches to throw the end cells associated therewith in series with said source of electric energy upon the dropping of the voltage across the mains into which said source of electric energy feeds below normal, and a circuit controllable by the operation of said switches to operate means for breaking contact between said voltmeter and said switches.

3. In an apparatus for the described purpose and in combination with a source of electric energy and supply mains connected thereto, of end cells connected to said source of electric energy and normally out of series with the mains into which said source of electric energy feeds, a voltmeter connected across the mains, a switch associated with each of said end cells, a circuit connected to said switches and controllable by said voltmeter for successively operating said switches to throw the end cell associated therewith in series with said source of electric energy upon the dropping of the voltage across the mains into which said source of electric energy feeds below normal, and a circuit controllable by said voltmeter for successively operating said switches to cut the end cell associated therewith out of series with said source of electric energy upon the rising of the voltage across said mains into which said source of electric energy feeds above normal, when said cells are in series therewith.

4. In an apparatus for the described purpose and in combination with a source of electric energy and supply mains connected thereto, of end cells connected to said source of electric energy and normally out of series with the mains into which said source of electric energy feeds, a voltmeter connected across the mains, a switch associated with each of said end cells, a circuit connected to said switches and controllable by said voltmeter for successively operating said switches to throw the end cell associated therewith in series with said source of electric energy upon the dropping of the voltage across said mains into which said source of electric energy feeds below normal, a circuit connected to said switches and controllable by said voltmeter for successively operating said switches to throw the end cell associated therewith out of series with said source of electric energy on the rising of the voltage across said mains into which said source of electric energy feeds above normal, when said cells are in series therewith, and a circuit controllable by the operation of said switches for breaking the contact between said voltmeter and said circuits.

5. In an apparatus for the described purpose and in combination with a source of electric energy and supply mains connected thereto, of end cells connected to said source of electric energy and normally out of series with the mains into which said source of electric energy feeds, a voltmeter connected across said mains, a switch associated with each of said end cells, a circuit connected to said switches and controllable by said voltmeter for successively operating said switches for cutting the end cell associated therewith in series with the source of electric energy upon the dropping of the voltage across said mains into which said source of electric energy feeds below normal, a circuit connected to said switches and controllable by said voltmeter for successively operating said switches for cutting the end cell associated therewith out of series with said source of electric energy upon the rising of voltage across said mains into which said source of electric energy feeds above normal, when said cells are in series therewith, and devices in said circuits and controllable by said voltmeter for cutting said circuits in or out of circuit with said switches upon the rise or fall of voltage across said mains.

6. In an apparatus for the described purpose and in combination with a source of electric energy and supply mains connected thereto, of end cells connected to said source of electric energy and normally out of series therewith when the voltage across the mains into which said source of electric energy feeds is normal, a voltmeter connected across said mains, a switch associated with each of said end cells, a circuit connected to said switches and controllable by said voltmeter for successively operating said switches to cut the end cell associated therewith in series with said source of electric energy upon the dropping of voltage across said mains into which said source of electric energy feeds below normal, a circuit connected to said switches and controllable by said voltmeter for successively operating said switches to cut the end cell associated therewith out of series with the source of electric energy upon the rising of voltage across said mains into which said source of electric energy feeds above normal, when said cells are in series therewith, a circuit controllable by the operation of said switches to operate the switch first in order of closing to open as the switch second in order of operation is operated to close when the voltage across the mains drops below normal, and a circuit controllable by the operation of said switches to operate the switch associated with the end cell in series with the source of electric energy to open as the switch next in order of closing is operated to close, when the voltage across said main rises and the end cells are in series therewith.

7. In an apparatus for the described purpose and in combination with a main source of electric energy, of an auxiliary source of electric energy for connection across the mains into which said main source of electric energy feeds, a controlling means connected across said mains, a circuit controlled by said controlling means, means associated with the auxiliary source of electric energy and connected to said circuit, the circuit operating the means associated with the auxiliary source of electric energy to increase the potential of said auxiliary source of energy upon the dropping below normal of the voltage across said mains, and a circuit controllable by said controlling means and connected to the means associated with said auxiliary source of electric energy for operating said means to reduce the potential of the auxiliary source of electric energy upon the rising above normal of the voltage across said mains.

In testimony whereof I have signed my name to this specification in the presence of two subscribing witnesses.

EMIL HENRY BENDEL.

Witnesses:
HARRY H. TOTTEN,
D. B. RICHARDS.